United States Patent [19]

Sado

[11] 4,083,641
[45] Apr. 11, 1978

[54] T-SHAPED STRUCTURAL JOINT

[75] Inventor: Yukio Sado, Ashahi, Japan

[73] Assignee: Yoshida Kogyo K.K., Tokyo, Japan

[21] Appl. No.: 785,511

[22] Filed: Apr. 7, 1977

[30] Foreign Application Priority Data

Apr. 10, 1976 Japan .................................. 51-40450

[51] Int. Cl.² .............................................. F16B 9/02
[52] U.S. Cl. ..................................... 403/260; 403/258
[58] Field of Search ............... 403/189, 247, 258, 260, 403/264, 230, 367, 368, 401, 268

[56] References Cited

U.S. PATENT DOCUMENTS

| 1,460,928 | 7/1923 | Tilden | 403/247 |
|---|---|---|---|
| 2,566,287 | 8/1951 | Finneburgh | 403/258 X |
| 3,202,245 | 8/1965 | LeTarte | 403/401 |
| 3,427,056 | 2/1969 | Cunningham | 403/258 |
| 3,519,292 | 7/1970 | Krikorian | 403/258 |
| 3,601,501 | 8/1971 | Johnson | 403/258 X |
| 3,962,774 | 6/1976 | Noro | 403/264 X |

FOREIGN PATENT DOCUMENTS

| 567,174 | 4/1975 | Switzerland | 403/297 |
|---|---|---|---|
| 683,386 | 11/1952 | United Kingdom | 403/264 |

Primary Examiner—Wayne L. Shedd
Attorney, Agent, or Firm—Hill, Gross, Simpson, Van Santen, Steadman, Chiara & Simpson

[57] ABSTRACT

A T-shaped structural joint includes a tubular member connected endwise to a plate member by a screw and a connector press-fitted in a hollow open end of the tubular member, the connector having on its periphery a knurled surface which is held in tight frictional engagement with the interior surface of the open end. The connector has a radially extending slot that allows the connector to contract when forcibly inserted into the tubular member, the connector having a tendency to expand or spring back under its own resiliency upon insertion such that the connector forcibly acts against the interior surface of the tubular member. The connector includes a notched and tapered sleeve that facilitates initial insertion of the connector.

10 Claims, 14 Drawing Figures

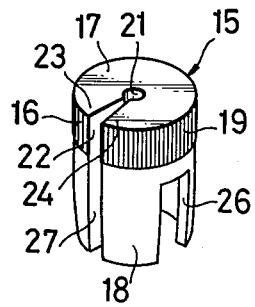
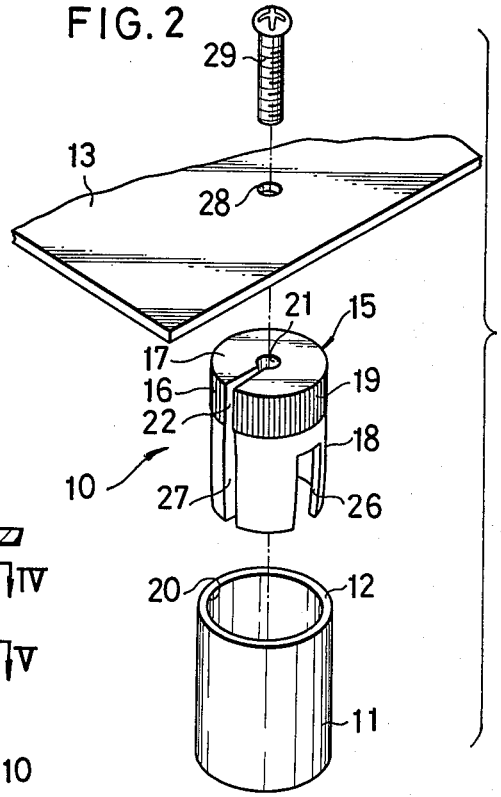
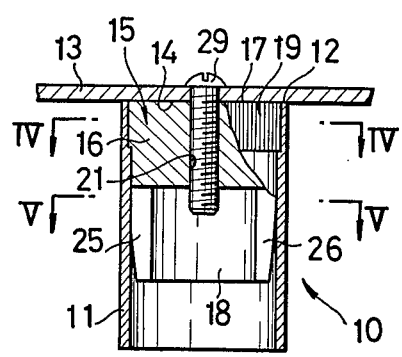
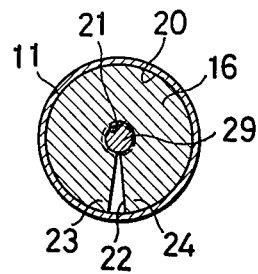
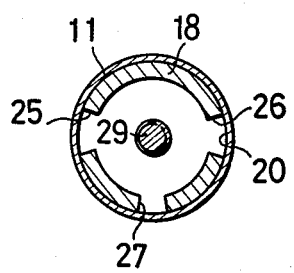

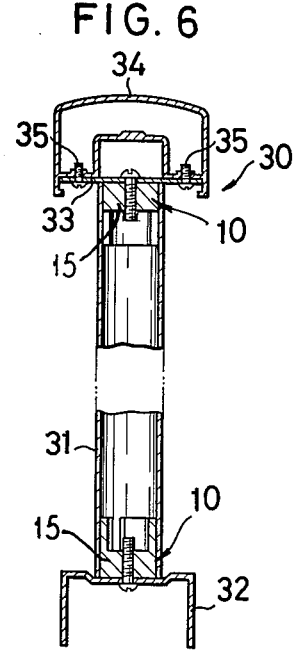
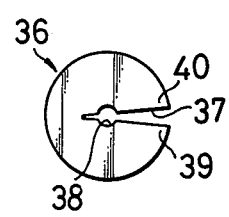
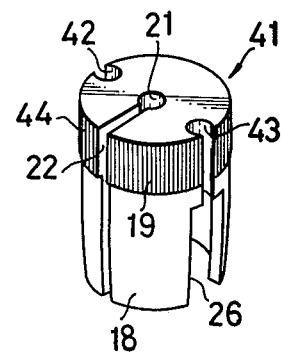
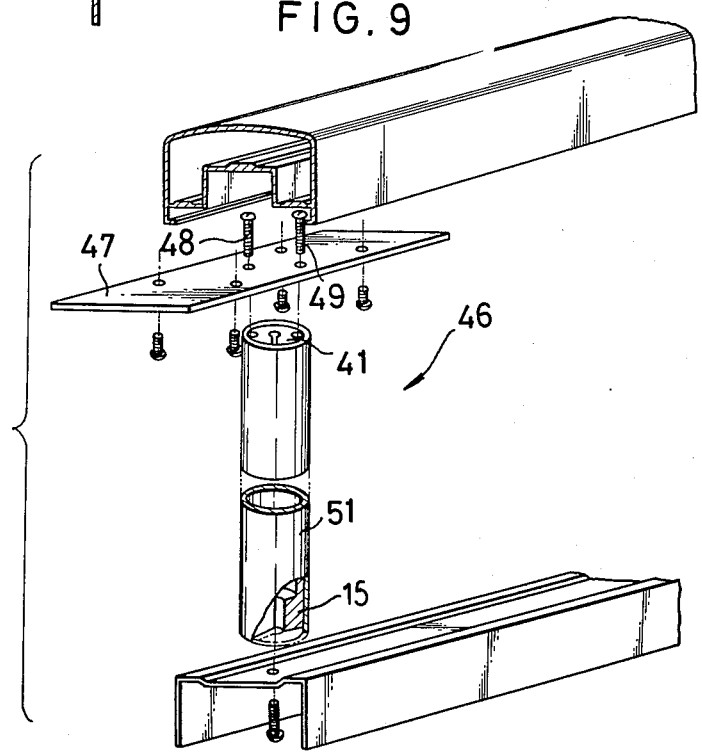

T-SHAPED STRUCTURAL JOINT

BACKGROUND OF THE INVENTION

1. Field of the Invention

The present invention relates to a structural joint between a plate member and a tubular member connected endwise to the plate member.

2. Prior Art

Various T-shaped structural joints have been proposed in an attempt to assemble metal railings such as tubular aluminum railings for use on balconies, stairs, guard rails and the like. One known connecting arrangement is welding. However, the procedure is time-consuming and expensive though it provides a rugged final structure. Bolts and screws have been used, but they become loose after a period of time to thereby render the railing structure less rigid and make it dangerous. Another type of interlocking device is a fastening connector made up of a plurality of interengaging members which when assembled hold the railing bars together. The cost and time involved in installing this fastening assembly, however, has limited its acceptability.

SUMMARY OF THE INVENTION

The T-shaped structural joint of the invention comprises a cylindrical or hexahedral connector force-fitted in a hollow end of a tubular member connected endwise to a plate member. The connector includes a body having on its outer has a a knurled surface held in tight frictional engagement with the interior surface of the hollow end. The connector body has central bore through which in one embodiment threadedly extends a screw passing through the plate member. A slot in the connector body extends between the bore and the outer periphery of the body, making it possible enabling the connector to contract as it is forcibly inserted into the tubular member. The connector upon installation has a tendency to expand or spring back within the tubular member, such that the connector is retained against removal or displacement. The screw or screws may be disposed in one or more other screw bores provided in the connector body, the bores being located adjacent to the outer periphery of the connector body and open along their sides facing the interior surface of the tubular member. As screws are turned into these bores they cut female threads in the interior surface of the tubular member. Thus, increased retention of the connector can be assured with these screws. The connector includes a notched tubular body or sleeve which is tapered toward its distal end for facilitating initial insertion of the connector into the tubular member.

Accordingly, it is an object of the present invention to provide a T-shaped structural joint which is quickly and easily assemblable.

Another object of the present invention is to provide a T-shaped structural joint which, when assembled, provides a rigid interlocking construction.

Still another object of the present invention is to provide a T-shaped structural joint between a tubular member and a plate member, the joint requiring no machining on the tubular member.

Many other advantages and features of the present invention will become manifest to those versed in the art upon making reference to the detailed description and the accompanying sheets of drawings in which preferred structural embodiments incorporating the principles of the present invention are shown by way of example.

BRIEF DESCRIPTION OF THE DRAWINGS

FIG. 1 is a perspective view of a connector constructed in accordance with the present invention;

FIG. 2 is a fragmentary exploded perspective view of a T-shaped structural joint employing the connector shown in FIG. 1;

FIG. 3 is an enlarged vertical cross-sectional view of the T-shaped structural joint;

FIG. 4 is a cross-sectional view taken along line IV—IV of FIG. 3;

FIG. 5 is a cross-sectional view taken along line V—V of FIG. 3;

FIG. 6 is a vertical cross-sectional view of a balustrade incorporating T-shaped structural joints shown in FIG. 3;

FIG. 7 is a plan view of a modified connector;

FIG. 8 is a perspective view of a connector according to another embodiment;

FIG. 9 is an exploded perspective view of a balustrade incorporating T-shaped structural connectors shown in FIGS. 1 and 8;

DETAILED DESCRIPTION OF THE PREFERRED EMBODIMENTS

Figure 10:
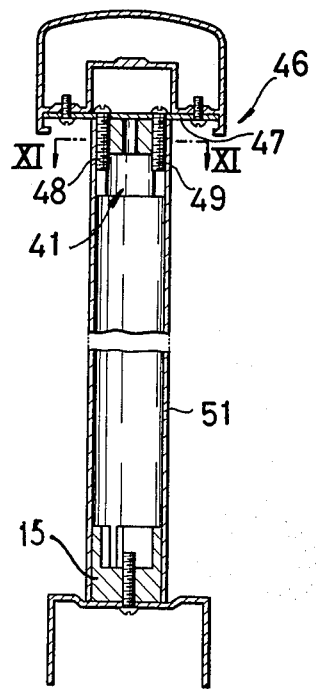
FIG. 10 is vertical cross-sectional view of the balustrade of FIG. 9.

In FIGS. 1 and 2, a T-shaped structural joint generally indicated 10 comprises a vertical hollow cylindrical or tubular member 11 having an open end 12, a horizontal plate member 13 extending substantially perpendicularly to the axis of the tubular member 11 and having a surface 14 (FIG. 3) for being disposed flatwise against the open end 12 of the tubular member 11, and a connector 15 to be force-fitted in the open end 12 for connecting the tubular member 11 endwise to the plate member 13.

The connector 15 is substantially cylindrical and includes a body 16 having an end face 17 to be held flatwise against the surface 14 of the plate member 13, and a sleeve 18 at an end of the body 15 opposite to the end face 17, the sleeve 18 being coaxial with the body 16. The connector body 16 has on and around its outer periphery and near the end face 17 a roughened surface 19 such as a knurled surface having a plurality of straight ridges extending lengthwise of the connector 15. The part of the body 16 having the knurled surface 19 thereon is larger in diameter than an interior surface 20 of the tubular member end 12 so that the connector 15 when forcibly inserted in the tubular member 11 can be retained against removal or displacement by the knurled surface 19 held in tight frictional engagement with the interior surface 20. An initial diameter of the body 16 therefore may be such that there is provided a close sliding fit between the interior surface 20 and the body 16 since knurling slightly increases in the tubular member 11 since knurling has a tendency to increase the diameter of the body part. However, to provide the connector 15 with a greater retentive force, a peripheral surface of the body 16 that is to be knurled should be slightly larger in diameter than the remainder. Typically, the peripheral surface to be knurled should initially be raised to the extent that after knurling valleys between adjacent knurl ridges have their bottoms that describe an imaginary peripheral surface lying substantially flush with the surface of the remainder of the body 16.

The connector body 16 has an untapped through bore 21 located substantially centrally thereof or coaxially therewith and extending axially of the body 16. The bore 21 receives a self-tapping screw 29. The connector body 16 has a slot 22 extending end to end axially thereof and communicating between the bore 21 and the knurled outer periphery 19, the slot 22 providing a pair of legs 23, 24 one on each side thereof. As better shown in FIG. 4, the slot 22 has a vee cross-section which progressively widens radially outwardly from the bore 21 toward the outer periphery 19.

The sleeve 18 is slightly tapered toward its distal end remote from the connector body 16 and has a pair of rectangular notches 25, 26 disposed in diametrically opposed relation (FIG. 5). The sleeve 18 has a slot 27 angularly spaced substantially 90° from each of the notches 25, 26. The slot 27 extends axially of the sleeve 18 and is in line and communicates with the slot 22 in the connector body 16. The slots 22, 27 allow the legs 23, 24 to move slightly toward each other under compressive forces.

The plate member 13 has a through hole 28 for the passage therethrough of the screw 29.

In assembly of the T-shaped structural joint 10, the connector 15 is first press-fitted into the tubular member 11 at the end 12 such as by striking the end face 17 with a hammer until the end face 17 is substantially flush with the end 12. The sleeve 18, being notched and tapered, is partially inserted into the tubular member 11 before hammering. As the connector 15 is forcibly inserted into the tubular member 11, it is squeezed to cause the legs 23, 24 to move closer against their own resiliency. When assembled, the knurled surface 19 is maintained in tight frictional engagement with the interior surface 20 of the tubular member 11, so that the connector 15 lockingly engages the tubular member 11 against rotation, displacement, and removal. Further, since the legs 23, 24 have a tendency to move apart or spring back under their own resiliency, the peripheral surface of the connector 15 is further pressed against the interior surface 20 of the tubular member 11.

Then, the plate member 13 is placed over the end face 17 of the connector 15 with the hole 28 in registry with the bore 21. The screw 29 is inserted through the hole 28 and turned into the bore 21 forming its own female threads in the bore 21 that defines the bore 21. Thus, as the screw 29 has a self-tapping helical. As the screw 29 is forcibly threaded in, it slightly widens the bore 21 and hence the slot 22 to thereby urge the legs 23, 24 apart into tighter engagement with the wall 20 of the tubular member 11. When the screw 29 is threaded fully into the connector 15, the T-shaped structural joint 10 is completed as shown in FIG. 3.

FIG. 6 shows a balustrade 30 incorporating two T-shaped structural joints 10. The balustrade 30 includes a hollow cylindrical baluster 31 having its lower end connected to a bottom rail 32 through the connector screwed to 15 and its upper end connected to an adaptor or attachment plate 33 through the connector 15 screwed to the plate 33 that in turn is fixed to a top rail 34 by means of a number of screws 35.

According to a modified connector 36 illustrated in FIG. 7, a vee slot 37 extends diametrically beyond a central bore 38 to give the connector 36 a greater yieldability that provides less resistance when its legs 39, 40 are forced together under compressive forces.

Figure 11:
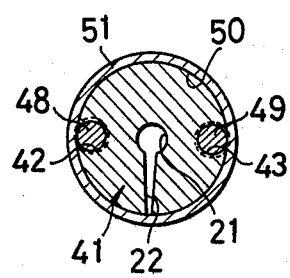
FIG. 11 is an enlarged cross-sectional view taken along line XI—XI of FIG. 10.

A connector 41 shown in FIG. 8 is similar to the connector 15 to FIG. 1 except for the provision of a pair of bores 42, 43 in its body 44, the bores 42, 43 extending axially thereof in registration with the notches 25, 26. The bores 42, 43 are located adjacent to the knurled outer periphery 19 and open along their outer sides to thereby provide communication with the outer periphery 19. As best shown in FIG. 11, the bores 42, 43 are disposed in diametrically opposed relation and angularly spaced substantially 90° from the slot 22.

In FIGS. 9 and 10, a balustrade 46 utilizes the connector 41 shown in FIG. 8. To affix the connector 41 to an adapter plate 47, a pair of self-tapping screws 48, 49 are used which pass through the plate 47 into the bores 42, 43, respectively. As the screws 48, 49 are turned into the bores 42, 43, they cut their own female threads in the bores 42, 43 and at the same time form female threads partly in the interior surface 50 of a tubular baluster 51. Thus, the screws 48, 49 positively engage the tubular baluster 51, thereby connecting the plate 47 to the tubular baluster 51 with greater mechanical strength than the embodiment of FIG. 3. With this arrangement, the connector 41 is more effectively prevented from accidental rotation in or removal from the tubular baluster 51 under severe external forces.

Figure 12:
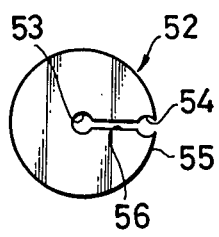
FIGS. 12 through 14 are plan views of modified connectors.
Figure 13:
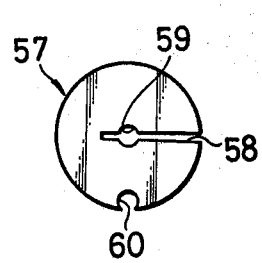
Figure 14:
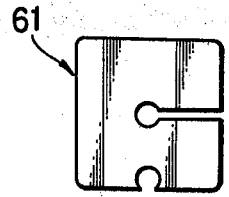

A modified connector 52 shown in FIG. 12 has a central bore 53 and an outer bore 54 located adjacent to an outer periphery 55 of the connector and having its outer side open. A radial slot 56 extends between these bores 53, 54. According to another connector 57 illustrated in FIG. 13, a slot 58 extends diametrically beyond a central bore 59, and a bore 60 with one side open is angularly spaced substantially 90° from the slot 58. FIG. 14 shows a hexahedral connector 61 to be fitted in a rectangularly hollow member.

Although various minor modifications may be suggested by those versed in the art, it should be understood that I wish to embody within the scope of the patent warranted hereon, all such embodiments as reasonably and properly come within the scope of my contribution to the art.

What is claimed is:

1. A T-shaped structural joint, comprising:
    (a) a first member having a hollow open end;
    (b) a second member extending transversely to and having a surface disposed flatwise against said open end, said second member having a through hole;
    (c) a connector disposed coaxially in said first member at its open end with a press fit, said connector having a body with an end face held flatwise against said surface of said second member, said body having on its outer periphery means defining a roughened surface held in frictional engagement with the interior surface of said hollow open end, there being a bore and a slot in said body, said bore being located substantially centrally of said body, and said slot communicating between said bore and said outer periphery; and
    (d) a screw passing through said hole threadedly into said connector.

2. A structural joint according to claim 1, said first member comprising a hollow cylinder and said connector body comprising a cylinder.

3. A structural joint according to claim 1, said connector including a body having a sleeve at an end thereof opposite to said end face, said sleeve being tapered toward its distal end and having a pair of opposed notches, and a second slot in said sleeve communicating with said first-mentioned slot.

4. A structural joint according to claim 1, said surface means comprising a knurled surface having a plurality of straight ridges extending lengthwise of said connector, said knurled surface being larger in diameter than said interior surface of said hollow open end.

5. A structural joint according to claim 1, said second member extending perpendicularly to said first member.

6. A structural joint according to claim 1, said screw extending into said bore.

7. A structural joint according to claim 1, said slot in its free state having a vee cross-section.

8. A structural joint according to claim 1, said body having a second bore communicating with said outer periphery, and a second screw passing through said second member threadedly into said second bore, said second screw having a portion held in self-tapping engagement with said interior surface of said first member.

9. A structural joint according to claim 8, said second bore communicating with said slot.

10. A structural joint according to claim 8, said second bore being angularly spaced substantially 90° from said slot.

* * * * *